United States Patent [19]

Sieling

[11] Patent Number: 5,337,546
[45] Date of Patent: Aug. 16, 1994

[54] HAY RAKING AND TEDDING APPARATUS

[76] Inventor: Nicolaas L. Sieling, Rotacon Farm, Waring Road, RD 1, Taupiri, New Zealand

[21] Appl. No.: 949,519
[22] PCT Filed: May 29, 1991
[86] PCT No.: PCT/AU91/00231
§ 371 Date: Nov. 25, 1992
§ 102(e) Date: Nov. 25, 1992
[87] PCT Pub. No.: WO91/18497
PCT Pub. Date: Dec. 12, 1991

[30] Foreign Application Priority Data

May 29, 1990 [NZ] New Zealand .................. 233856
Nov. 13, 1990 [NZ] New Zealand .................. 236071

[51] Int. Cl.$^5$ ............................................. A01D 78/10
[52] U.S. Cl. .................................. 51/365; 56/370; 56/366
[58] Field of Search ............... 56/365, 366, 367, 370, 56/372, 375, 376, 377

[56] References Cited

U.S. PATENT DOCUMENTS 3,962,854  6/1976  van der Lely et al. ............... 56/370
4,128,987 12/1978  Zweegers ........................... 56/366 X
4,367,622  1/1983  Aron et al. ........................ 56/364

FOREIGN PATENT DOCUMENTS 2430398  1/1975  Fed. Rep. of Germany ........ 56/370
2517651 10/1975  Fed. Rep. of Germany ........ 56/370
7809024  3/1980  Netherlands ....................... 56/370
8902581  5/1991  Netherlands ....................... 56/370

OTHER PUBLICATIONS

M & W Gear Advertisement for M & W Hayfly RV-300 Tedder-Wondrower, Gibson City, Ill., Jan. 1987.

Primary Examiner—Ramon S. Britts
Assistant Examiner—James A. Lisehora
Attorney, Agent, or Firm—Young & Thompson

[57] ABSTRACT

A hay making apparatus includes a rotor carrying demountable rigid tynes spaced about its periphery and coupled to a drive motor, preferably a hydraulic type. The rotor has an annular body of a resiliently deformable elastomeric material advantageously having a cross-sectional shape similar to that of a tire for a motor vehicle with its longitudinal axis vertically oriented. The rotor has the following: an inwardly projecting upper wall which couples the annular body flexibly to the motor; an inwardly projecting lower wall which follows undulations in the ground surface; and a vertical wall in which passages are formed for seating the tynes. In use, the tynes are held in place solely by centrifugal force and by contact with the passage walls.

9 Claims, 7 Drawing Sheets

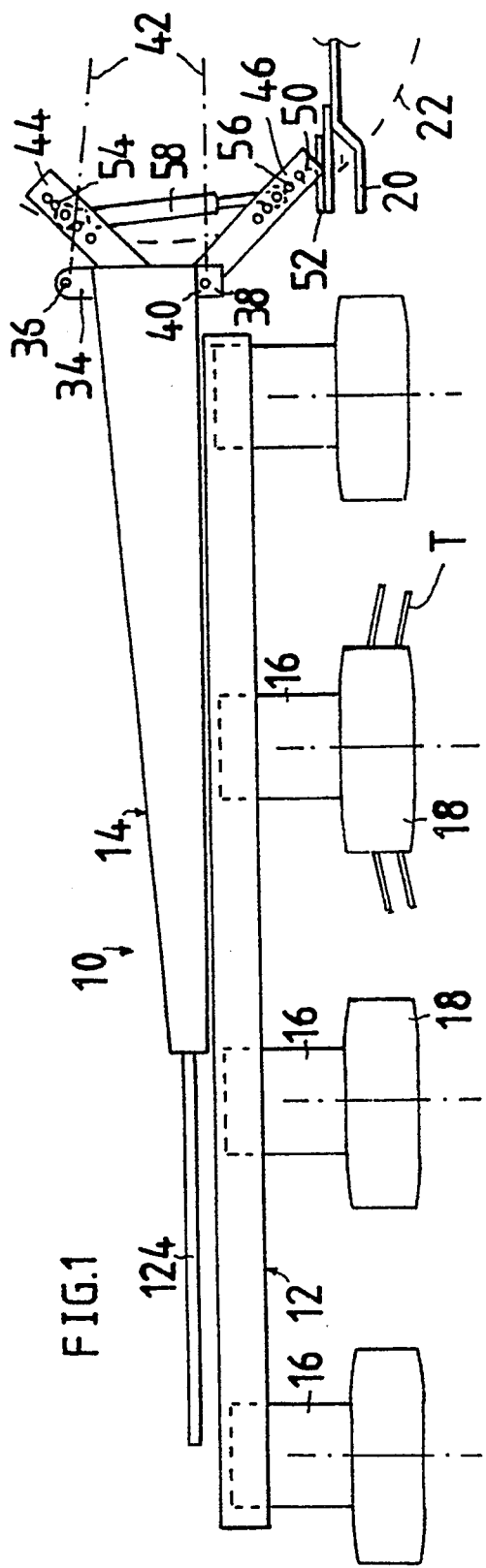
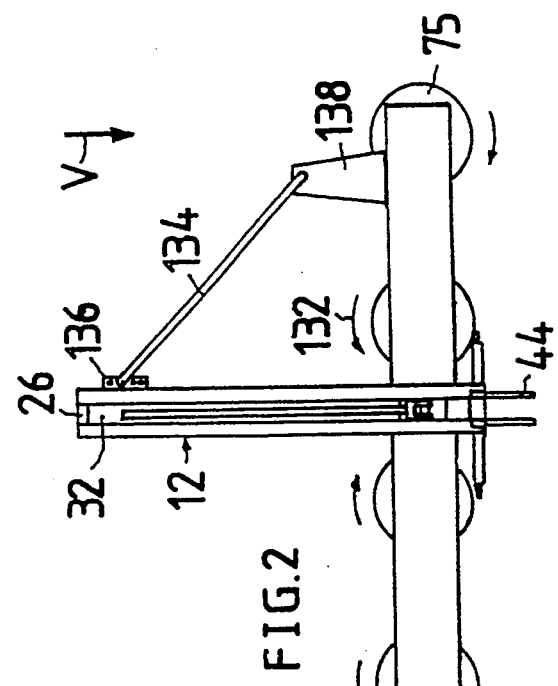
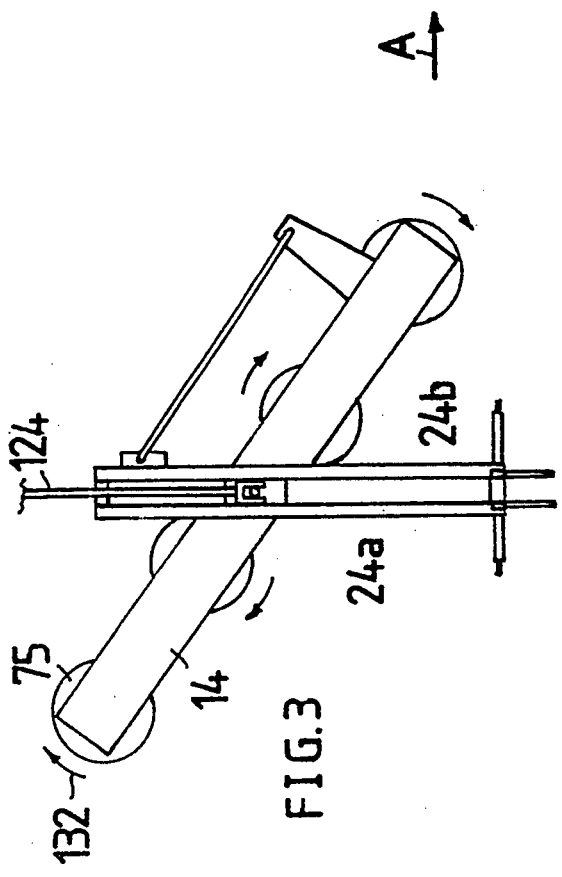

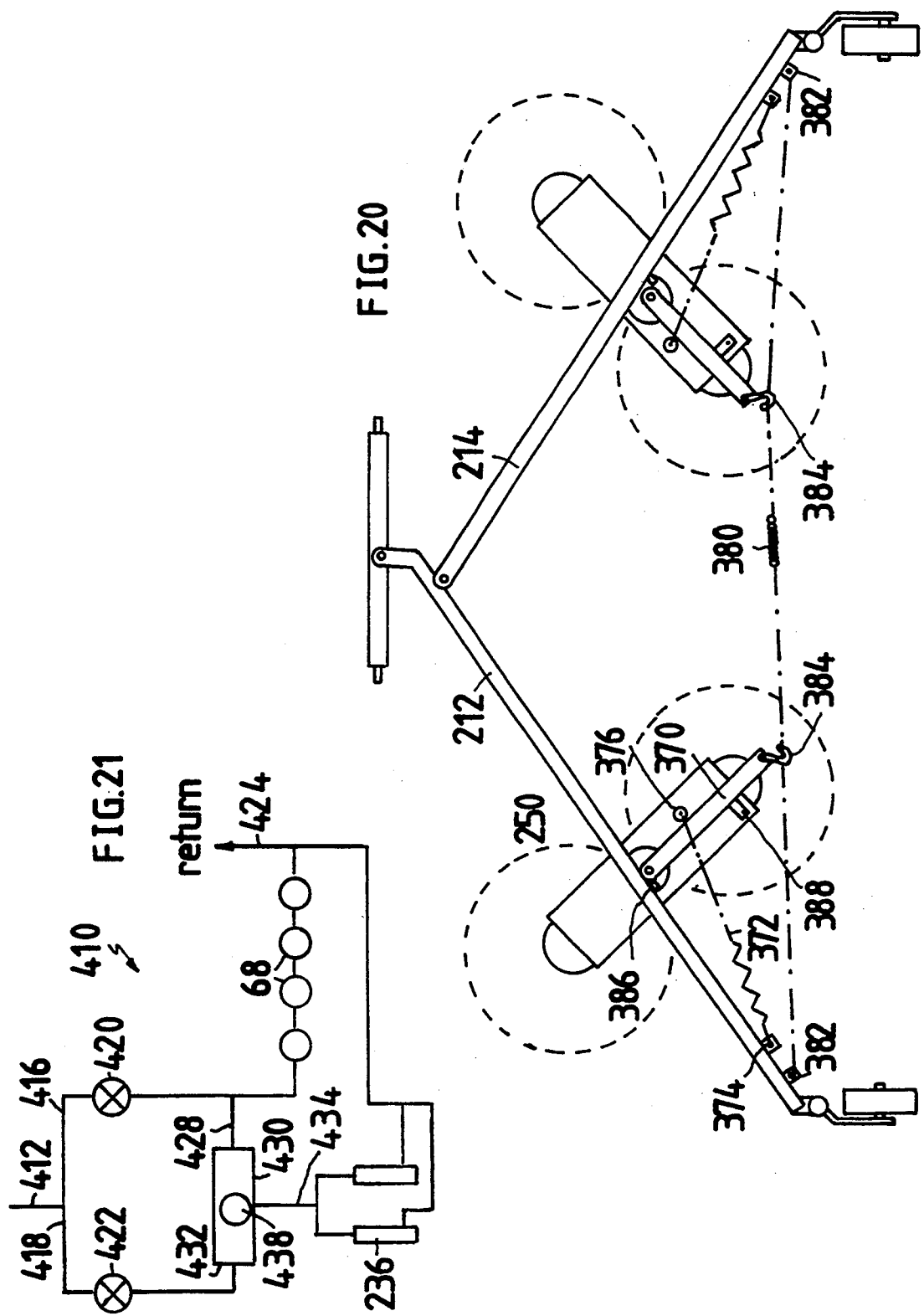

HAY RAKING AND TEDDING APPARATUS

FIELD OF THE INVENTION

This invention relates to apparatus for making hay; i.e. for raking or tedding hay. For the purposes of this specification 'hay' includes straw and other fibrous crops.

DISCUSSION OF THE PRIOR ART

Hay raking and tedding machines have been known for many years. Nowadays the majority of such machines comprise rotors which revolve about rotational axes which in use are vertical or nearly vertical. Each rotor is provided with a number of tynes which project outwardly from a tyne-carrying structure which is connected to a drive mechanism coupled to the power take off (PTO) of a tractor to which the machine is hitched. In nearly all commercially available such machines the tyne-carrying structure comprises a rigid assembly of steel components. It is essential that the tynes are mounted so that they can deflect when they encounter obstacles in use. Tyne failure is probably the most common cause of downtime for all hay making machines.

In many cases the tyne is made of spring steel which is wound into a coil at the base of the shank of the tyne so that the tyne itself can yield when it strikes an obstacle. The tynes are bolted or otherwise fixed to the tyne-carrying structure. In other cases the tyne is rigid but is fixed on a mounting which itself is provided with a spring. The mounting thus yields when the tyne strikes an obstacle. Tynes of both such types are expensive and, despite their construction, they are still prone to be damaged. Moreover replacement thereof is a relatively laborious operation. This is an important factor considering that all hay making machines are provided with a large number of tynes.

In other cases the tyne is not rigid, being constructed of, for example, flexible steel cable or belting. A disadvantage of such tynes is that they have a limited service life. Tynes made of belting or other nonmetallic material wear out quickly in service. On the other hand tynes made of steel cables would probably be subject to metal fatigue, besides being expensive.

Examples of the tyne constructions discussed above are disclosed in New Zealand patent specifications #175663, 163085, 159850, 186612, 165156 160385, 186537, 193122, 183195, 162462, 170390, 156740, 191248, 182130, 180769, 151543 and 183628.

The first of the above patent specifications (i.e. #175663) discloses a rotor comprising a cylindrical skirt of flexible material which is suspended from various forms of supporting apparatus. The tynes are bolted to the skirt. The applicant is not aware of any commercial use of a machine incorporating a rotor of this type: however, it appears that the supporting apparatus is rather complex and would be costly to make and probably unreliable in use. It is clear from the specification itself of patent #175663 itself that this complexity arises because of the fact that the skirt envisaged is thin and flexible.

A machine incorporating yet another type of rotor is disclosed in New Zealand patent #188590. This rotor comprises a rigid drum provided with a frustoconical rubber skirt provided on its upper face with upstanding rib-like integrally moulded formations which, according to the specification, "favour the entrainment" of fodder. This machine is in commercial use. It has been found to have a number of disadvantages. The skirt is expensive and has a limited working life. It also tends to entrain a lot of dirt since it presents a continuous surface below the said formations. The machine is furthermore suitable only for raking.

SUMMARY OF THE INVENTION

According to the invention there is provided a rotor for a hay making apparatus, the rotor being arranged to carry demountable tynes spaced about its periphery and to be coupled to drive means for rotating the rotor about a rotational axis, characterised in that the rotor comprises a self-supporting rotor body constructed of a resiliently deformable elastomeric material, the rotor body being provided with seats for the tynes and at least one flange-like protuberance located between the seats and the rotational axis.

At least one of the protuberances may be a single member extending completely around the periphery of the rotor body. In this case the term "self supporting" as used herein means that although the rotor body is elastically deformable, it is nevertheless at least inherently stiff enough to support the rotor without any part of the rotor body folding or collapsing when the rotor is detached from the machine and rests on, or is lifted at, at least two points on said single member located at equal distances on either side of the rotational axis. A motor vehicle tire, or an annular body having similar characteristics, is thus "self supporting" as contemplated herein. The rotor body may also however comprise a number of discrete protuberances disposed at a common level around the periphery of the rotor body. In this case the term "self supporting" similarly means that the rotor body is at least inherently stiff enough to support the rotor without any part of the rotor body folding or collapsing when the rotor is detached from the machine and rests on, or is lifted at, at least two points on said discrete protuberances located at equal distances on either side of the rotational axis.

The raking apparatus on which the rotors are fitted can be mounted on a tractor by support means of various kinds which are capable of lifting or lowering the apparatus so that the rotors remain at an approximately constant working level above the ground. As will be clear from this specification, the rotor body should resist deformation to the extent that, when the rotor body comes into contact with the ground in use, the raking apparatus undergoes an apparent change of weight which can be transmitted to the support means and thus to keep the rotors at the required working level. The term "self supporting" has been defined to impose what is considered to be a practical minimum to the ability of the rotor body to resist deformation.

In one form of the invention at least a portion of the rotor body comprises an annulus having its centre coincident with the rotational axis. Advantageously however the entire rotor body is an annulus having its centre coincident with the rotational axis.

In one aspect of the invention the flange-like protuberance constitutes a skid member which follows undulations in the ground when it comes into contact therewith as the rotor rotates. In an alternative aspect of the invention the flange-like protuberance constitutes a coupling member for coupling the rotor to the drive means, the flange-like protuberance being arranged to spring upwardly under force applied by the rotor when the rotor comes into contact with the ground in use.

Advantageously however the rotor body comprises an upwardly extending wall in which said the or each said seat is formed, a first said flange-like protuberance constituting a skid member arranged to follow undulations in the ground when it comes into contact therewith as the rotor rotates and a second flange-like protuberance constituting a coupling member for coupling the rotor to the drive means, the second flange-like protuberance being arranged to spring upwardly under force applied by the rotor when the rotor comes into contact with the ground in use. The wall and the first and second flange-like protuberances are advantageously integrally formed one with the other.

Further according to the invention, a tyne is seated in at least one of said seats, and the tyne is retained in an operational position in said seat without the use of extraneous fastenings.

According to one aspect of the invention the tyne is seated in said seat so as to be capable of inward deflection towards the rotational axis from the operational position without substantial deflection of the rotor body.

In one form of the invention the tyne comprises at least one shank which projects through a passage in the rotor body and an enlarged portion adjacent an inner end of the shank, the tyne being held in the operational position by virtue of centrifugal force arising from rotation of the rotor which causes the enlarged portion to be held seated against an inner face of the rotor body,

BRIEF DESCRIPTION OF THE DRAWINGS

The invention is further described with reference to the accompanying drawings in which:

FIG. 1 is a scale side view of a tractor mountable mechanised hay making machine 10 for raking or tedding hay showing a rotor carrying beam 12 in a position in which it located when it is not in use;

FIG. 2 is a plan view in smaller scale of the machine 10 with the beam in a tedding position;

FIG. 3 is a plan view, similar to FIG. 3, with the beam 12 in a raking position;

FIG. 20 is a schematic plan view, similar to Figure 11, of a modified hay making machine; and FIG. 21 is a line diagram of part of the hydraulic system of the machine shown in the drawings.

DETAILED DESCRIPTION OF EMBODIMENT

Figure 4:
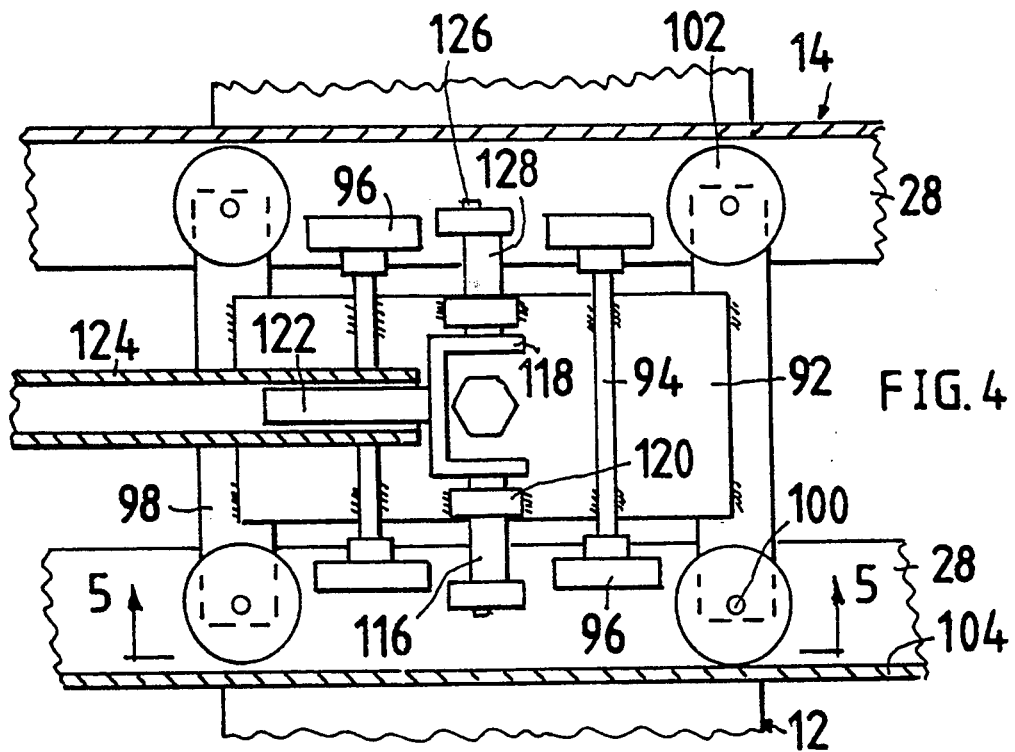
FIG. 4 is a sectional view in larger scale of the beam 12, viewed in the direction of arrow A in FIG. 2.

Referring to FIGS. 1 to 4 of the drawings one example of a hay making machine 10 comprises a first beam 12 mounted on a second beam 14. The beam 12 carries four drums 16 on the lower end of each of which a rotor 18 is mounted. The rotors comprise tynes T. The beam 14 serves to mount the beam 12 on an agricultural tractor, only the drawbar 20 and the profile of the rear wheels 22 of which are shown.

The beam 14 comprises a pair of channel members 24a, 24b joined at their ends by cross members 26. The channel members are left and right handed but are otherwise substantially mutually identical. Each comprises upper and lower flanges 28, 30 with a gap 32 therebetween. The channel members 24a, 24b taper inwardly from front to rear. Lugs 34 are mounted at the top of the forward end of the beam with a pin 36 therebetween. Square tubes 38 are welded to the bottom of the forward end of the beam, projecting to each side thereof. The tubes 38 carry pins 40 at their outer ends. The pins 36, 40 are category 2 pins for receiving a three point hitch (indicated by the dotted lines 42) by means of which the beam 14 is mounted on the back of the tractor.

A first pair of spaced plates 44 are welded to the forward end of the beam 14. These plates project upwardly and forwardly. A second pair of spaced plates 46 are also provided. These plates 46 are pivoted to the beam 14 by means of a pin which passes through holes in the rear ends of the plates 46 and is mounted between the inner ends of the square tubes 38 in alignment with the pins 40. A roller 50 is carried on a pin mounted between the forward ends of the plates 46. The roller bears on a plate 52 mounted on the top of the drawbar 53 of the tractor. The function of the plate 52 is only to provide a flat surface on which the roller can run and the plate can be dispensed with if the upper face of the drawbar is flat. Rows of holes 54, 56 are drilled in the plates 44, 46. (In the drawings only one row is shown in each of the plates). A hydraulic ram 58 is mounted between the plates 44, 46 by means of suitable pins which can be located by choice in pairs of the holes 54, 56. The ram is connected to the hydraulic system of the tractor and extension thereof causes the roller 50 to bear down on the drawbar 20 and thus to cause the beam 14 to be lifted upwardly. The importance of this will be explained.

The beam 12 comprises a horizontal rectangular upper wall 60 from the long edges of which parallel vertical rectangular side walls 62a, 62b depend. An inwardly projecting flange 64 is formed along the lower edge of each side wall to stiffen the beam 12. The four cylindrical steel drums 14 are provided with flanges 14a by means of which they are bolted to the flanges 64 at equal spacing therealong, the inner edges of the flanges 64 being cut away to accommodate the drums. Each drum is provided with an inwardly projecting annular flange 66 set in a small distance from its lower end. A hydraulic motor 68 is mounted on this flange by means of bolts which pass through holes in the flanges 70 on the rotor body of the motor and in the flange 66. The motor 68 is mounted so that the rotational axis 72 of its output shaft 74 is in alignment with the longitudinal axis of the drum.

A tyne-carrying rotor 18 is mounted on the shaft 74 of each motor. The rotor comprises a resilient tyne carrying annular rotor body 75 mounted on a disc shaped plate 76 with a central boss 78 welded thereto. The plate is mounted on the shaft 74, being retained thereon by means of a bolt 80 which is screwed into the end of the shaft 74. The boss is keyed to the shaft 74. An upstanding annular flange 84 is welded to the plate 76. This flange 84 is set in marginally from the lower end of the drum 14 and serves to substantially prevent hay and other debris from collecting in the space between the flange 66 and the plate 76. In this example diameter of the plate 76 is 36 cm and the rotor body is 60 cm.

Hydraulic hoses (not shown) are mounted in the beam 14 and connect the hydraulic motors 68 in the drums in series to the hydraulic power system of the tractor.

The tyne carrying rotor body 75 may conveniently be comprised of the tire of a motor vehicle since such a tire has a shape and also properties of resilience and toughness which meet very well the requirements of the rotor body 75. It should be understood however that the invention is not confined to the use of a tire and in other embodiments the rotor body 75 may vary in its shape and construction and, in particular, may be a purpose designed and made component. Furthermore, in principle, the rotor body 75 may be comprised of two or more components joined together.

In the present embodiment however the rotor body 75 comprises a downwardly depending skirt 86 and inwardly projecting upper and lower annular flanges 88 and 90 respectively. The skirt and the flanges 88, 90 are moulded as an integral unit of a tough fabric-reinforced rubber material. The upper flange 88 is bolted along its inner periphery to the plate 76. The upper flange serves to provide a resiliently flexible drive connection between the plate 76 and the skirt 86. It may be noted that this flexibility is in both the vertical and circumferential directions so that the motor is cushioned from shock loads arising when the rotor comes into contact with the ground and also when the rotor or the tynes strike an obstruction.

The horizontally disposed flanges 88, 90 have characteristics in common which are of particular advantage for the machines described herein. One flange forms a simple, resilient connection for transmitting the drive from the motors to the tynes. This function is performed by the upper flange 88 in the present example but this is not necessarily essential. Despite being resilient the flange is nevertheless stiff enough to support the weight of the whole rotor, including the tynes, without folding or collapsing, although being supported only its inner periphery. This stiffness minimises the distance through which the beams on which the rotors are mounted must be lifted in order for the rotor to be lifted clear of the ground or of any obstacle.

The lower flange 90 on the other hand serves as a resilient skid which absorbs the initial shock applied to the rotor when it hits the ground periodically during operation. Furthermore the flange 90 comes into contact with the ground more or less constantly but only lightly so that the contact does not substantially increase the power requirements nor subject the flange 90 to excessive wear. As described elsewhere in this specification, the flange 90 thus transmits any increase in torque due to contact with the ground to the hydraulic system of the tractor. This enables machines fitted with rotors of the invention to follow the contour of the ground closely. The fact that the flange 90 is horizontal increases its ability to follow the contour and also reduces wear. The flange 90 must therefore be stiff enough to act as both an effective shock absorber and a torque sensor. It is therefore considered sufficient that the lower flange should have about the same minimum stiffness as the upper flange.

Another advantage of the lower flange acting as a skid is that it eliminates the design problems which arise as a result of having to support a dolley wheel or skid below the hydraulic motor. Moreover it adds strength to the rotor and can be used to mount a cover (which could for example be bolted to the inner periphery of the flange 90) to prevent debris from getting into the interior of the rotor body 75. It also helps to retain the tynes on the rotor body when the rotor is at rest.

In alternative embodiments, one or other of the flanges may be omitted. For example, a single flange may be provided which projects inwardly from an upstanding skirt. Such a flange would serve both as-a skid and as a connection between the drive and the tynes. However, one advantage of tire shaped rotor bodies on a multi-rotor machine is that, because of possibly greater elastic flexibility of the rotor bodies, all rotors are able to continue to function when the machine is traversing ground having greater differences in contour over the width of the machine.

It is also be possible to provide that at least a portion of the skirt depends from a single flange. Here the lower edge of the skirt is adapted to act as a skid. The lower edge may be thickened for this purpose or may be provided with an outwardly projecting flange disposed below the tynes.

In a further alternative embodiment, the annular skirt is replaced by circumferentially spaced bosses on which the tynes are seated, the bosses being preferably moulded integrally with at least one of the flanges. In yet another embodiment, at least one of the annular flanges is replaced by a number of discrete sector-shaped flanges spaced apart around the skirt. It is however preferable that either the skirt or at least one of the flanges is a complete annulus.

The preferred tyne (which will be described in detail later) is made of spring steel and comprises at least one leg which works the hay. This leg projects through a passage in the skirt 86. The leg is a slack fit in this passage which serves to hold the tyne in its approximate working position when the rotor is not turning but which also allows the tyne a degree of unrestrained movement from the working position when the tyne encounters an obstacle during operation of the machine. The tyne also comprises a part which is located inside the rotor body 75 and is in abutment with the inner face 86a of the skirt. The tyne is by this means held in place on the rotor against the action of centrifugal force generated by the rotation of the rotor. The function of the skirt is thus to provide a resilient seat for the tyne which seat (a) is sufficiently tough and hard wearing to transmit the drive from the motor to the tyne; (b) yields in preference to the tyne when the tyne strikes an obstacle; and (c) is nevertheless sufficiently stiff to hold the tyne in its proper working position in the course of normal operation.

As has already been mentioned, a major advantage of using a resilient rotor body 75 for mounting the tynes is that it can be directly coupled to an hydraulic motor. Apart from providing a resilient mounting for the tynes it is also itself capable of both longitudinal and radial flexure if it meets an obstacle. Another advantage is that it saves a considerable amount of weight.

Although it is preferred to use hydraulic motors to drive the rotors, they could also be driven by non-hydraulic means such as a mechanical drive train or pulleys connected to the power take off of the tractor.

Figure 5:
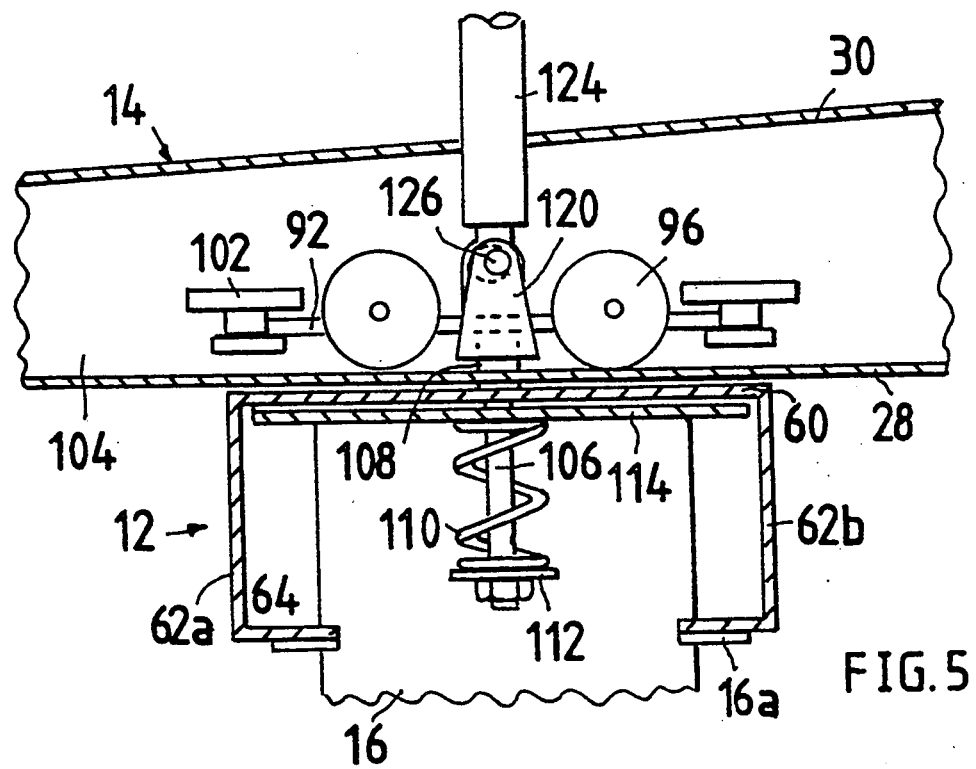
FIG. 5 is a sectional view in Arrows 5—5 in FIG. 4.
Figure 16:
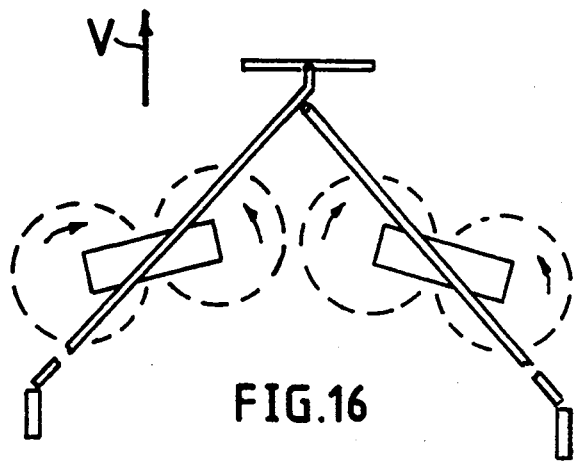
FIG. 14 to 19 are schematic plan views of the machine in various alternative working positions.
Figure 13:
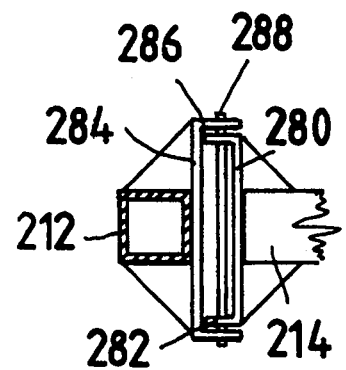
FIG. 13 is a detail of a joint between the supporting beams.
Figure 17:
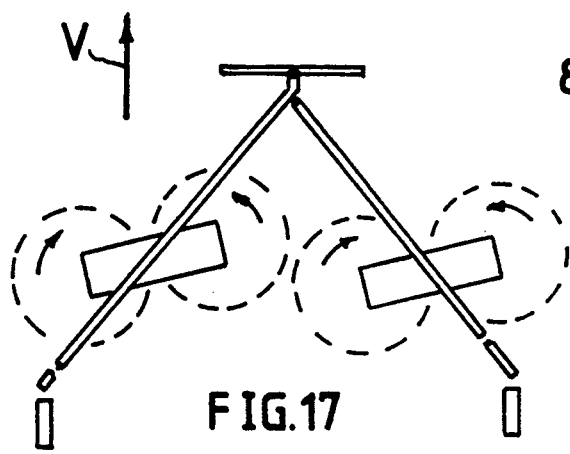
Figure 7:
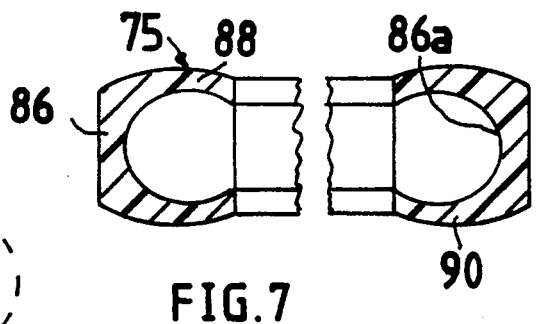
FIG. 7 is a somewhat schematic cross sectional view through part of a rotor body.
Figure 6:
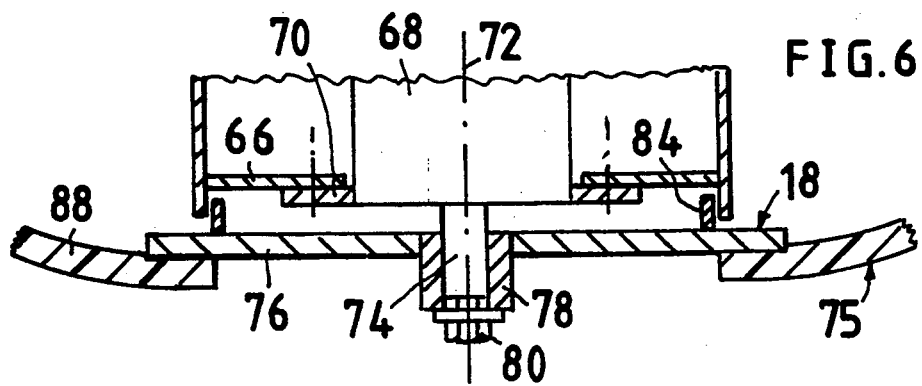
FIG. 6 is a sectional view of part of the lower end of drum on which rotor is mounted.

The beam 12 is mounted on the beam 14 by means of the carriage assembly shown in detail in FIGS. 5 and 6. The carriage assembly comprises a rectangular carriage plate 92 between the ends of which are welded two spaced parallel axles 94. Wheels 96 are mounted at the ends of the axles 94 and run on the lower flanges 28 of the beam 14. Cross bars 98 are welded to each end of the carriage plate 92. Upwardly projecting stub axles 100 are welded to the ends of the cross bars 98 and carry wheels 102 which bear on the upright walls 104 of the channels 24a, 24b. The wheels 102 thus guide the carriage plate 92 when it runs along the beam 14 supported by the wheels 96.

A downwardly projecting bolt 106 is fixed in the centre of the plate 92. This bolt also projects downwardly through the centre of the upper wall 60 of the beam 12. A spacing sleeve 108 is located between the carriage plate 92 and the upper wall 60. A strong compression spring 110 is mounted over the lower end of the bolt and held in place thereon by means of a nut and washer 112. The springs exerts upward pressure against a cheek plate 114 through which the bolt passes and which bears against the upper wall 60 of the beam 12. By this arrangement the entire beam 12 is resiliently suspended on the carriage plate 92 and can be transported along the beam 14 by the carriage assembly. Moreover, for reasons which will be described, the beam 12 can pivot about the bolt 106 between the positions shown in FIG. 1 and FIG. 2.

It is however necessary that the beam 12 can be locked in these two positions as well as in intermediate positions therebetween. To this end a clamp assembly is provided. This clamp assembly comprises two stub shafts 116 welded one to each arm of a fork 118 and mounted in bearing housings 120 welded to the carriage plate 92. The fork is provided with an actuating lever 122 extended by a handle 124. An eccentric extension 126 is machined into the outer end of each stub shaft 116 and a trunnion plate 128 is pivoted to and hangs freely from each extension 126 over one or other of the flanges 28 of the beam 14. The geometry of the arrangement is such that when the lever 122 and handle 124 are in the vertical position shown in FIG. 5 the flat lower edge of the trunnion plate 128 is lifted clear of the flange 28. This has the effect of lowering the carriage plate 92 so that it is supported by the wheels 96 on the flanges 28 and also of lowering the beam 12 and thus increasing the clearance between it and the beam 14. The beam 12 can thus be moved along the beam 14 and also be pivoted about the bolt 106. However, when the lever is moved by the handle to the horizontal position shown in FIGS. 1 to 4 the trunnion bears down on the flange 128 and lifts the carriage plate 92 upwardly. This also lifts the beam 12 upwardly and it's upper wall 60 comes into frictional contact with the bottom of the beam 14. The beam 12 is thus locked in position. Desirably a friction pad (not shown) is inserted between upper wall 60 and the bottom of the beam 14. It is also desirable that thin strips of a material such as stainless steel sheet should be fixed to the upper face of the upper wall 60 to protect the paint applied to it from being damaged by contact with the bottom of the beam 14.

As in the case of conventional hay making machines, the rotors are usually moved to different positions (relative to the direction of travel of the tractor) for the raking and tedding operations. For tedding, the rotors are usually best positioned in a line disposed at right angles to the direction of travel. This is the position of the beam 12 shown in FIGS. 2, 4 and 5. In this position a pair of rotors is located on the each side of the centre line and the rotors in each pair are set to rotate in opposite directions so that when the tynes reach the point of closest approach to each other they are moving in a rearward direction. This is shown FIG. 2, the arrow 130 indicating the direction of travel of the tractor and the arrows 132 indicating the direction of rotation of the rotors. For raking, the rotors are usually best positioned in a line disposed at an angle of about 45° to the direction of travel and set to rotate all in the same direction so that when the tynes in each pair of rotors reach the point of closest approach to each other they are moving in opposite directions with the tynes on the forwardmost rotor moving rearwardly. This is shown in FIG. 3.

It is an important advantage of the present machine that the beam 12 can be located much closer to the tractor than has heretofore been possible. A drive shaft is required to connect the rotors of conventional machines to the power take off of the tractor. Because the centre of the beam which carries the rotors is of necessity some distance from the tractor when the beam is in the angled raking position, the drive shaft must be quite long. The presence of this drive shaft prevents the beam being brought up close to the tractor in the tedding position. The closer the beam is to the tractor the smaller is the vertical movement of the rotors as the tractor traverses undulations in the terrain.

Another advantage of the present machine is that it may be possible to set it for tedding with the beam 12 in the raking position shown in FIG. 3. In this case the rotors will be set to rotate all in the same direction but opposite to the direction shown in FIG. 3.

The position taken up by the beam 14 on the beam 12 can be controlled by mounting a the rod 134 between a lug 136 and a plate 138 welded on the sides of the beams 14 and 12 respectively. Although the beam 12 is manoeuvred into position by hand, it can take up only one position along the beam 14 for each, angular position thereon.

The tynes may vary in shape. They are preferably constructed substantially entirely of steel, preferably spring steel rod. They should furthermore preferably be capable of both raking and tedding. Moreover, if it is necessary to alter the working positions of the tynes for raking and tedding, this should be an easy and quick operation.

Figure 10:
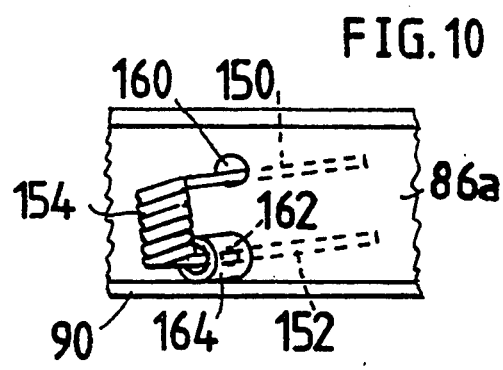
FIG. 10 is a view of the tyne mounted for tedding.
Figure 9:
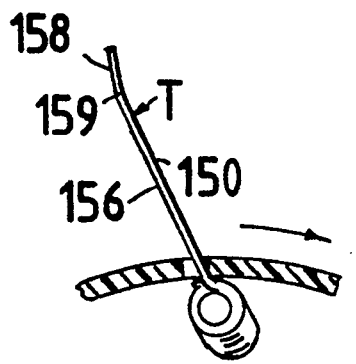
FIG. 9 is a view on Arrow D in FIG. 8.
Figure 8:
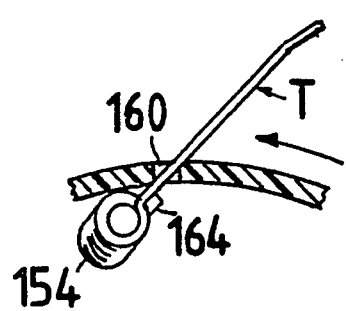
FIG. 8 is a view of a tyne mounted for raking in a rotor body.

In FIGS. 8 to 10, the tyne T comprises a length of 10 mm spring steel rod bent to shape. The tyne comprises two legs 150, 152 which are spaced apart from one another by means of a helically wound base portion 154 at the inner end of each leg. Each leg comprises a long straight inner portion 156 which is disposed at an angle to a shorter straight outer portion 158. The portions meet at a junction 159. The legs are parallel one to the other. The rotor body 75 is provided in its skirt with many equally spaced pairs of passages 160, 162 as there are tynes. In the present example there are twelve such pairs. Each passage 160 is located directly above a passage 162. The base portion 154 of a tyne is disposed against the inner face 86a of the skirt. Four tynes are positioned inside the rotor body 75 with (in FIGS. 8 and 9) the leg 150 projecting through an upper passage 160 and the leg 152 projecting through the passage 162 therebelow. Before the tyne is fitted however, a spacer is mounted over the leg 152. In the example the spacer is in the form of a short length of rubber hose 164.

The passages 162 are of 10 mm diameter. However, the passages 160 are of 30 mm diameter so that the leg of a tyne is a slack fit in the passage 160. When the rotor is at rest the tynes are held loosely on the rotor body by friction. However, when the rotor is set in motion the tynes move to, and are held in, their correct working positions substantially by centrifugal force. More particularly, the lower end of the tyne is initially spaced from the inner wall 86a by the hose 164. However, because the base portion 154 of the tyne is relatively massive, it tends to move outwardly into contact with the inner face 86a of the skirt. This causes the inner portion of each leg to be raked backwardly from the true radial direction. Moreover, both legs are downwardly slanted.

In FIGS. 8 and 9 the direction of rotation is anti-clockwise. The tyne has been inserted so that the outer portions 158 of the legs are raked opposite to the direction of motion at an angle of about 45° to the radius passing through the junction 159. This is the favoured position for raking. For tedding all that is required is for the direction of rotation to be reversed. The tyne will then take up the position shown in FIG. 10. The geometry of the tyne is such that the outer portions 158 of the legs are close to being coincident with the radius that passes through the junction 159.

For tedding with the machine 10, the outer rotor to the left of the beam 14 and the inner rotor to the right will rotate anticlockwise and will have the tynes mounted as in FIG. 8; and the remaining pair of rotors will rotate clockwise and will have the tynes mounted as in FIG. 9.

If raking is required with the rotor turning clockwise, the tyne can be turned around (from the position shown in FIG. 8) so that the leg 150 passes through the lower passage 162 and the leg 152 passes through the upper passage 150. It is also necessary to mount the hose over the leg 150.

When the rotors are running at their operational speed as long as the tynes are out of contact with the ground they take up a position of equilibrium under the centrifugal force generated by the rotors. Another factor which must be taken into account in the design of the tynes is that the outer tip of each is intended to come into contact with the ground during the part of the cycle of rotation in which the hay is picked up. It should be noted that for this purpose it is usual for the rotational axes of the rotors to be canted forward from the true vertical by an angle of between about 5° and 10°. This is achieved by adjusting the length of the links of the three point hitch. Thus with the beam 14 in the tedding position (shown in FIG. 2) it is desirable that the tips of the tynes should be in light contact with the ground from an angle of about 45° before to about 45° after the forwardmost position reached by the tynes as the rotor rotates. Because of the fact that the rotor is canted forward, the tynes will pivot relative to the rotor vertically upwardly from the position of equilibrium from the point where they first touch the ground to where they reach their forwardmost point; and then they will pivot downwardly back to the position of equilibrium from their forwardmost Point to the point where they lose contact with the ground. To achieve this the tynes should be seated so as to pivot vertically as freely as possible. This is one reason for enlarging the diameter of the passage 160. The enlarged hole also enables the tyne to pivot more freely in the horizontal plane.

The tyne must of course be designed so that it takes up the correct position of equilibrium. This will in turn have the desirable effect that if when it is in contact with the around, its tip encounters a depression or hole in the ground the tyne will pivot downwardly at least until it gets to the position of equilibrium. The tip will thus drop down into the hole or depression at least to some extent.

It is also envisaged that the drum 16 may be tilted sideways on the beam 12 so that the rotational axes of the rotors are canted sideways from the true vertical by an angle of between 5° and 10° The reason for this is to optimise the angular position at which each tyne comes into contact with the ground during the raking operation and thus ensure that it does the best job of picking up the hay and depositing it at the correct place for picking up by the adjacent rotor.

Furthermore, when the tractor is being driven without the machine 10 being in use the machine 10 is in practice raised by the three point hitch to a much higher position than that shown in FIG. 1 and the beam 14 may then be at a substantial angle from the true horizontal.

It will be clear to the skilled reader that the terms 'vertical' and 'horizontal' as used in this specification are used in a practical sense rather than a strict geometrical sense.

It is not essential that the tynes are seated in passages which pass through the skirt. In an alternative embodiment, the skirt may be provided with thickened bosses each incorporating a moulded-in socket in which a tyne can be mounted from the outside.

Another advantage gained from the use of hydraulic motors is that the line which feeds the ram 58 can be coupled directly or indirectly to the line which feeds the motors. This means that when one or more of the rotors encounters an obstacle or encounters excessive drag as a result of coming into contact with the ground, the pressure of the hydraulic fluid in the feed lines will increase and automatically cause the ram (which lifts and lowers the beam 14) to extend thereby raising the rotors higher off the ground. The sensitivity of this automatic operation can be finely controlled by mounting the ram in holes 54, 56 in the plates 44, 46 which are either closer to or further away from the beam 14. It should also be mentioned that the tynes are more accurately held at the correct height above the around as a result of the fact that the lower flange 90 of the rotor is closer in a radial direction so the tynes than, for example, the wheel or skid which is located at the centre of a conventional rotor. In fact the flange 90 need only be about 200 mm radially inward from the tyne. The point at which the flange contacts the ground (which is what determines the height at which the rotors are positioned) is thus more likely to be representative of the level of the ground directly beneath the tynes.

The use of a ram 58 to control the height of the rotors above the ground is not necessarily essential. The forward end of the beam 14 could, for example, be suspended by one or more springs hung from a suitable support mounted on the tractor. Springs could also used to assist the ram.

To reverse the direction of rotation of the rotors a suitable control valve assembly can be provided on the beam 12. Alternatively, quick release couplings may be provided in the feed and return hoses to the motors and these connections can simply be switched over when necessary.

A second example of a hay making machine 210 is illustrated in FIGS. 11 to 21. It is to be understood that the machine 210 comprises a number of components which are substantially identical to components found in the machine 10. It is not considered necessary to describe these components in detail. The only components described herein are those which comprise modifications of the corresponding components of the machine 10 or components which are not found at all in that machine.

Figure 11:
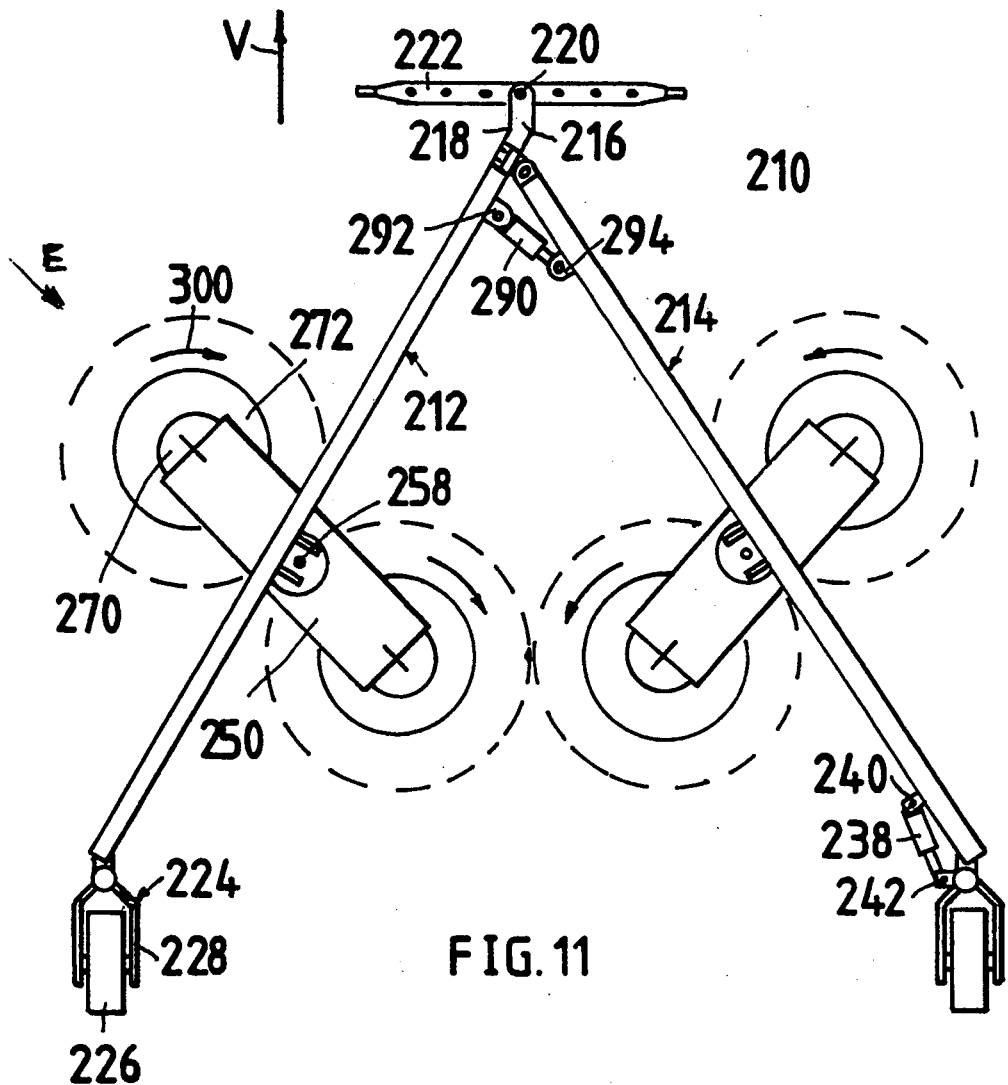
FIG. 11 is a plan view of an alternative making machine comprising supporting beams and rotors in a first raking position.
Figure 12:
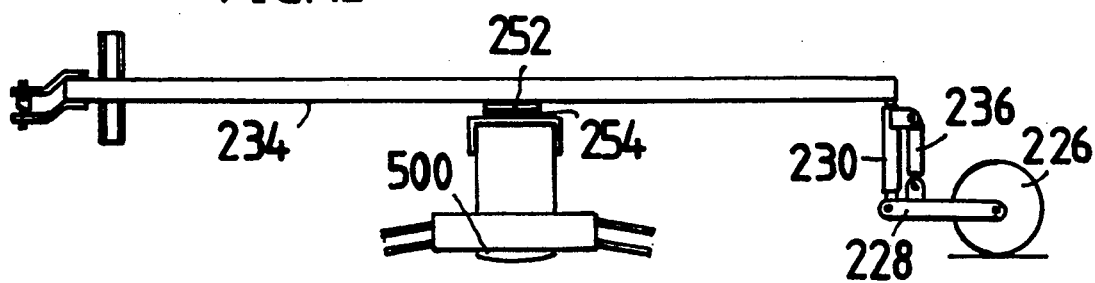
FIG. 12 is a side view (on Arrow A in FIG. 1) of a part of the machine.

In FIGS. 11 and 12 the hay making machine 210 comprises two supporting beams 212, 214 which, apart from certain differences which will be described, are substantially similarly constructed. The beam 212 is of welded steel box construction. In the present example it is 10 cm×10 cm in cross section and about 3.6 meters long. At its forward end it is provided with a fork 216 which, in the present example, is cranked at 218 so that it is disposed at an angle to the longitudinal axis of the beam. A pin 220 connects the beam 212 to a conventional tool bar 222 which is mounted between the lower two links of the three point hitch of a tractor and embraced by the fork.

A road wheel assembly 224 is mounted at the rear of the beam 212. The assembly comprises a pneumatic tired wheel 226 mounted on a forked arm 228, which is hinged to the lower end of a metal sleeve 230. A spigot is welded to the lower face 234 of the beam 212 and objects downwardly into the sleeve which can pivot about the spigot. The upper end of a hydraulic lack 236 is anchored on the sleeve and the ram of the jack is anchored on the forked arm 228. Thus when the jack is extended the arm 228 swings downwardly relative to the beam 212; this action thus lifts the beam when the wheel is in contact with the ground. The wheel assembly has a castoring action but can optionally be steered by means of a hydraulic ram 238 (shown in FIG. 11) which is mounted between two trunnions 240, 242 welded on the beam 214 and the sleeve 230 respectively. A diametral passage is drilled in the spigot. A number of pairs of diametrically opposed holes are drilled in the sleeve, each pair being spaced about the circumference of the sleeve. The wheel assembly can be turned about the spigot until one of the pairs of holes is lined up with the passage. The assembly can be locked in this position by means of a pin which can be passed through the aligned holes in the sleeve and the passage through the spigot.

The diameter of the wheel 226 in the present example is 450 mm.

A cross beam 250 of box section is mounted below the beam 212, the joint being located at the approximate longitudinal centre of the beam 250 and approximately halfway between the fork 216 and the wheel assembly 224. The joint comprises two circular plates 252, 254 of the same size, the plate 252 being welded to the lower face 234 of the beam 212 and the plate 254 being welded to the upper face of the beam 250. For a reason which will be explained the centre of the plate 252 is off set from the longitudinal centre line of beam 212. The centre of the plate 254 is however located on the longitudinal centre line of the beam 250. The two plates are clamped together by means of a bolt 258 which passes through their centres. A leaf spring is located between the head of the bolt and the face of the beam 250 on which the head bears. A pad of suitable material is inserted between the two plates to promote friction therebetween.

The construction of the joint enables cross beam 250 to be swivelled to a desired operating position and quickly locked in position by pulling up the bolt 258. If necessary the bolt may be replaced by means of a quick release clamp similar to that used in the carriage assembly described with reference to FIGS. 4 and 5.

The leaf spring allows the beam 250 to rock to some extent on the beam 212. If the material of which the friction pad is constructed has a high degree of compressibility it may be possible to omit the leaf spring.

Two drums 270 are mounted on the ends of the channel and are equally spaced to either side of the bolt 258. A tyne carrying rotor 272 is mounted at the lower end of each drum 270. The drums and rotors are substantially identical to the drums 216 and rotors 218 on the machine 10 and will not be described in detail here. The tynes are also substantially similar to the tynes T described above. In the present example the distance between the rotational axes of the rotors on each beam 250 is about 1.20 meters.

The beam 214 is substantially similar to the beam 212. Furthermore, a road wheel assembly 224 and a beam 250 carrying drums 270 and rotors 272 are mounted on the beam 214. However, referring to FIG. 13, at its forward end the beam 214 is provided with a fork 280 comprising upper and lower flanges 282 the distance between which, in the present example, is about three tynes greater than the depth of the beam. A similar fork 284 having flanges 286 is welded to the beam 212 a short distance behind the front end thereof. The two beams 212, 214 are joined together by means of a pin 288 which passes through the flanges 282, 286. This construction serves to limit the amount of flexure which takes place between the two beams 212, 214 at the joint therebetween.

Figure 18:
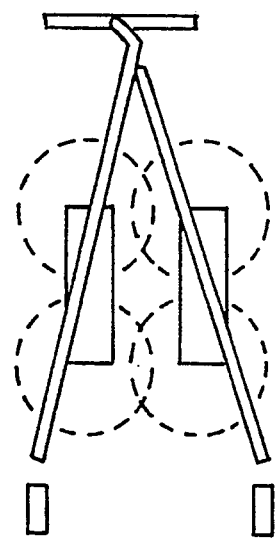
Figure 14:
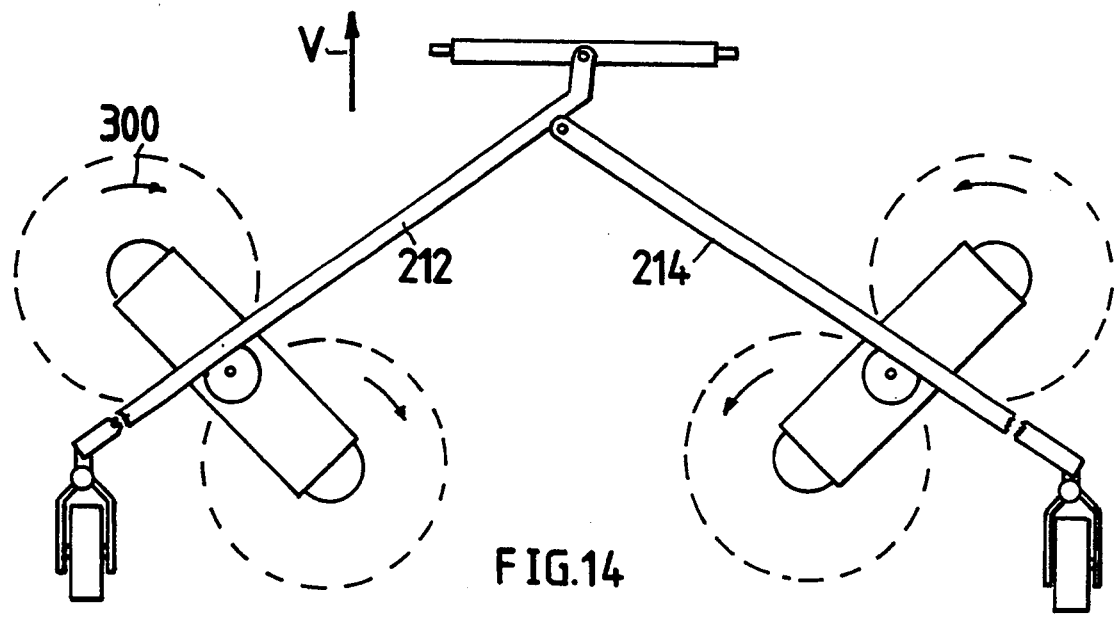

A hydraulic ram 290 is mounted between trunnions 292, 294 welded to the beams 212, 214 respectively. This ram 290 is connected to the hydraulic system of the tractor and can be actuated by the driver of the tractor to cause the beams 212, 214 to pivot, jack-knife fashion, relative to one another. The two beams are thus positioned relative to one another in V-configuration, the angle between them being variable from a minimum, as illustrated in FIG. 18, and a practical required maximum as illustrated in FIG. 14.

There is a number of advantages in pivotably joining the two beams 212, 214 together. In the first raking position shown in FIG. 11, the beams are disposed at an angle of about 60° to one another and are located at substantially equal angles one on each side of the fore-and-aft centre line of the tractor to which the machine is hitched. The machine will take up this position behind the tractor whenever both wheel assemblies 224 are allowed to castor freely. In this first raking position the cross beams 250 have been pivoted and locked in a position in which they are at about 45° degrees to the direction of travel V of the tractor with the inner rotor on each beam 250 located to the rear of the outer rotor.

The rotors have been set so that they rotate in the direction of the arrows 300; i.e. viewed from above, the rotors on the beam 212 rotate clockwise and the rotors on the beam 214 rotate counter-clockwise. Because of the geometry of the components, the paths swept out by the two forward rotors overlap the respective paths swept out by the rearward rotors. Furthermore the two rearward rotors are located close together so that the baths which they sweep out are located close to one another. In this configuration of the machine hay is gathered into a central windrow located behind the centre of the tractor.

The machine can be used in the first raking position when it is intended that a bailing machine should be brought in soon afterwards to ball the hay picked up from the windrow. The angle between the beams 212, 214 can be finely adjusted from the tractor during operation to ensure that a windrow is made which is best suited to the bailer which is to be used.

Some bailing machines will be able to pick up and bale hay only from a windrow formed from hay which has been teased by the machine operating in the first raking position as described. In other cases however it will be of advantage to set the machine in the second raking position shown in FIG. 14. To understand this properly it should be borne in mind that in the operation of some mowing machines the cut hay is left behind in swaths the distance between which is about equal to the width of the swaths. For example when a 2.1 meter drum type mowing machine is used it leaves the hay in swaths which are about 1.1 meters wide and about 1.0 meter apart. The distance across three of such swaths is thus about 5.3 meters.

In the second raking position the beams 212, 214 have been set by the ram 290 to a wider angle than that shown in FIG. 11. The cross beams have been set so that they remain at about 45° to the direction of travel of the tractor (shown by the arrow V). The rearward rotors are further apart than in the first raking position so that there is a gap of about 1.10 meters between the tynes on the inner rotors. In this second raking position the machine can straddle three swaths of hay left by a 2.1 meter mower and rake the hay in the two outer swaths and deposit it on the centre swath which is left substantially undisturbed.

It takes less tyne to form a single windrow from three swaths and the operation is thus very economical. Furthermore a windrow thus formed helps to make a uniform bale. It should be said however that not all bailing machines are capable of handling such a windrow. However, even if on this account the windrow is formed by the machine in the first raking position, the bale is still likely to have better uniformity. This is because many conventional raking machines take two passes to form a windrow. The width and density of a windrow formed in two passes is very variable and dependent largely on the skill of the operator.

It is another significant advantage of the machine that it can also rake three swaths of freshly mown grass into a windrow for baling to form silage. Furthermore uniform width and density of the windrow is particularly important when the grass is to be harvested by a silage machine; such machines have banks of knives for cutting the grass and the efficiency thereof is very dependent on the uniformity of the swath of grass Being fed therethrough.

The machine can also be used for tedding. For this purpose the beams 212, 214 are adjusted by the ram 290 so that, in a first tedding position shown in FIG. 15, the inner rotors are spaced the same distance apart as the rotors on each cross beam 250. The cross beams are set so that they are in mutual alignment and at 90° to the direction of travel V. The rotors are set to rotate in the direction of the arrows 300. That is, the outer rotor on the left hand beam 250 and the inner rotor in the right hand beam 250 rotate clockwise; and the outer rotor on the right hand beam and the inner rotor on the left hand beam rotate anti-clockwise.

Tedding operations are also often performed on hay which is lying in swaths. It may be desirable in some circumstances to tease the hay and bring the swaths relatively closer together. For this purpose the beams 250 can be set in the tedding position shown in FIG. 16 with their inner ends slightly forward of their outer ends. In other circumstances it may be desired to tease the hay and move both swaths laterally an equal distance. For this purpose the cross beams can be set in the tedding position shown in FIG. 17. In this position the beams 250 are mutually parallel but the inner rotor of the left hand beam is forward of the inner rotor on the right hand beam.

To balance the reactive forces applied by the rotors to the two beams 212, 214 the bolts 258 for mounting the cross beams 250 are off set from the longitudinal centre lines of the beams 212, 214. Each bolt is located as far as practical on a line through the pin 220 and the vertical line through the point of contact of the wheel 226 with the ground.

As already mentioned it should be possible to cant the rotors forward from the vertical by about 5° to 10°. The planes in which the tynes rotate thus intersect the ground in front of the rotors. This is easily achieved during operation by lowering the three point hitch so that, while the axes of rotation remain perpendicular to the Beams 212, 214, these beams are lower to the around at their forward ends than at their rear ends. Because the rotors are lowered in this action and thus tend to come into contact with the ground, torque requirements increase and, as previously mentioned, the hydraulic pressure increases. This causes the jacks 236 to raise the rear ends of the beams 212, 214 and automatically position the rotors at the correct working height above the ground.

The machine can be set in yet another position, shown in FIG. 18. Here the beams 212, 214 are brought as close together as is practically possible; this is determined by the point at which the rotors come into contact with each other when the cross beams 250 are positioned parallel to the direction of travel of the tractor, This position is very suitable when the machine is to be moved from one field to another or towed over a public road. The machine occupies a minimum of lateral space and is thus less likely to be damaged when passing through gates or to be an encumbrance to traffic on the road.

Figure 19:
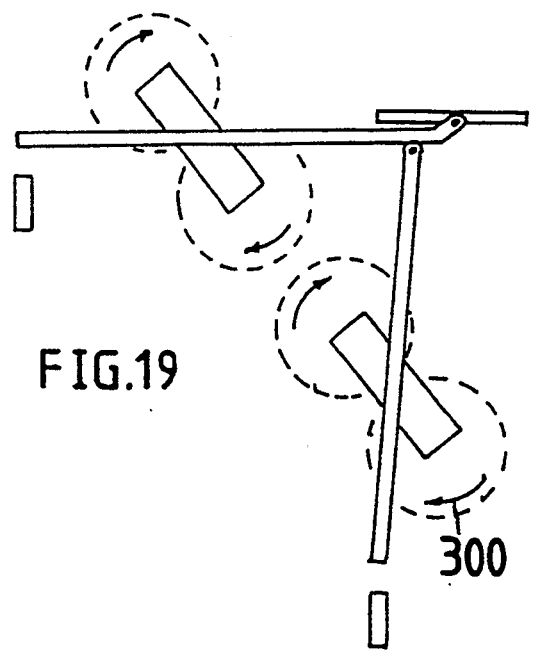

It may in some circumstances be desirable to off set the tracking of the machine from the centre line of the tractor. An example of this is shown in FIG. 19 and may be achieved by locking the wheel 226 on the beam 214 in an off set position. Raking or tedding may be carried out in the off set position. In the example shown in FIG. 19, if all of the rotors are set to rotate clockwise, a windrow will be formed to the right of the outer rotor on the beam 214.

The machine illustrated in FIG. 20 comprises an alternative arrangement for mounting the cross beams 250 on the beams 212, 214. In this construction the bolts 258 are set to allow the cross beams to pivot freely. Flat steel arms 370 also pivotably mounted on each bolt 258. A strong tension spring indicated by the dotted line 372 is mounted between a first lug 374 on the upper face of each cross beam 250 and a second lug 376 mounted the upper face of each beam 212, 214. The lug 376 bears on the edge of the arm 370. The springs thus tend to pull the cross beams 250 into alignment with the beam 212, 214. A chain (indicated by the dotted line 380) is strung between lugs 382 located at the outer ends of the beams 212, 214, Selected links of the chain can be hooked in hooks 384 located one at the end of each arm 370. By adjusting the length of the sections of chain between the two hooks 384 and between each hook 384 and the respective lugs 382 the two cross beams 250 can be fixed in their required working positions.

A stop 386 is welded on each plate 252. The stop is positioned to limit the swivelling of the cross beam so that it takes up its correct position for the transport mode.

Figure 15:
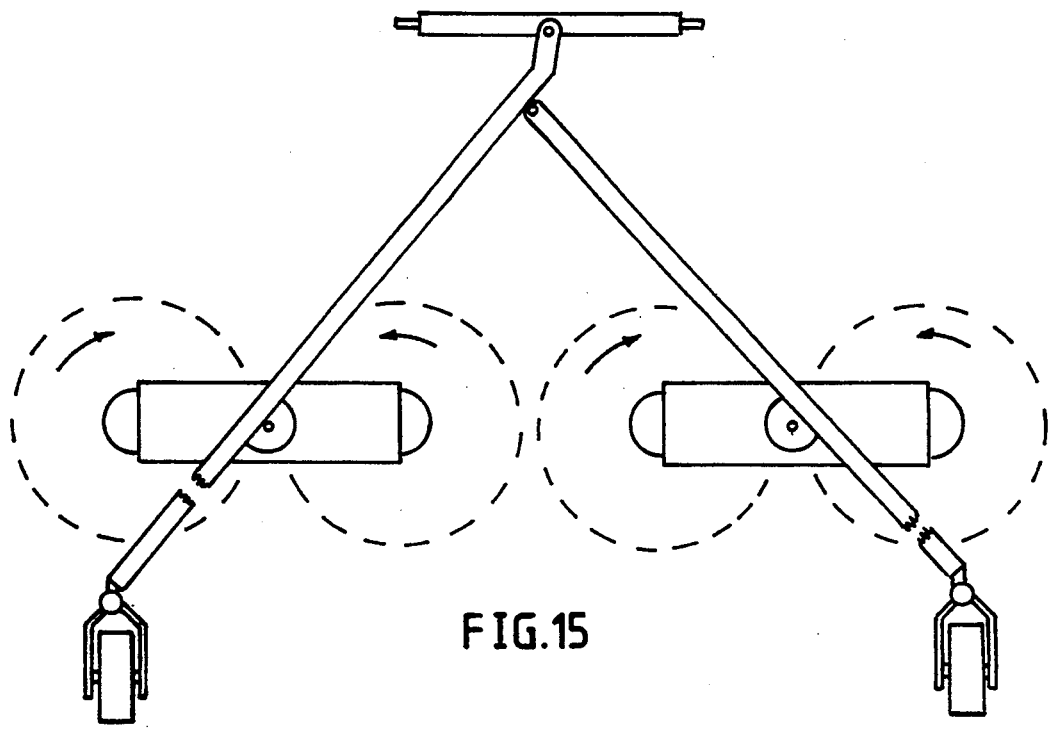

For setting the cross beams 250 in line with each other In the tedding position (as shown in FIG. 15) it is advantageous to attach the chain to pins fixed on lugs 388 welded to the arms 370. These pins are off set from the centre lines of the arms. Since the arms are in alignment, this increases the moment of force applied by the chain to each cross beam which is thus more effectively held in its working position by the chain.

The second beam 212 could also be provided with a steering ram for its wheel assembly 224. Furthermore, in some cases it may be unnecessary to provide any means for actively steering either or both of the wheel assemblies. It may be possible to replace the ram 238 with, for example, a simple tie rod having a series of longitudinally spaced holes for receiving pins which can be passed through the trunnions 240, 242 to lock the wheel assembly in the required positions. Even if a wheel assembly is free to castor in tedding or raking operations, it will be advantageous to be able to lock it in the fore-and-aft position when the machine is to be backed. This may be achieved quickly by means of welding vertically disposed tubes to the end of the beam and the sleeve 230 on which the wheel assembly is mounted. These tubes are positioned so as to be in axial alignment when the wheel is in the fore-and-aft position. A pin can then be dropped into the tubes to lock the wheel in position during the backing operation.

Similarly it may also in some cases be possible to replace the hydraulic ram 290 with a similar tie rod for receiving pins which can be passed through the trunnions 290, 294 to lock the beams 212, 214 in the required positions.

It will of course be necessary to provide an annular resilient rotor body 75 which is of diameter best suited to the geometry of the other components of the machine. It is envisaged that in the machine 210 illustrated the diameter of the rotor body will be about 700 mm.

The jacks 236 for adjusting the wheels 226 are advantageously interconnected with the hydraulic motors which drive the rotors 272 as shown in FIG. 21. A control mechanism 410 is mounted in the power line 412 from the tractor. The mechanism comprises an inlet duct which divides into two branches 416, 418 both of which are provided with independent manually operable shut off valves 420, 422. The power line 424 to the motors (which are in series) is connected to one branch 416. A branch 428 from the duct 416 goes to one arm 430 of a T-junction, the other arm 432 of which is connected to the branch 418. The Dower line 434 to the jacks 236 is connected to the leg of the T-junction. A ball 438 is located in the T-junction. When the valve 420 is opened fluid is fed to the rotors and the valve 422 is returned. However at the same time the ball moves to a seat in the arm 432 (if it is not already in that position) so that fluid is also fed to the jacks 236. At start-up the pressure is high and the jacks are lifted virtually instantaneously; the rotors are thus lifted clear of the around before they start to turn. As the rotors get up to speed the pressure drops and the jacks are lowered until the rotors get to their working positions. If the rotors are to be stopped the valve 422 is opened and the valve 420 is returned. The ball moves to a seat in the arm 430 so that power to the motors is cut off. The jacks 236 lift the rotors clear of the ground.

This arrangement ensures that the rotors are held well clear of the ground when the machine is in the transport mode and also when they are started up and shut off. Furthermore they are automatically maintained at their correct working height during operations. If one of the rotors comes into contact with the ground or some other obstacle the hydraulic pressure in the system increases. The rear ends of the beams are lifted and the rotor is thus lifted clear of the ground. Because of the fact that the rotors are located between the ground wheels 226 and the wheels of the tractor the movement of the rotors to clear the obstacle is less pronounced than in the case of the machine 10. Moreover because less power differential is required to actuate the jacks 236 the machine responds more quickly when there is an increase in torque demand.

It has been found advantageous to provide a dished plate below each tire as shown at 500 in FIG. 12. If the rotor drops, the centre of this plate is the first point to come into contact with the ground. The frictional force applied to the rotor as a result of the ground contact is much diminished by the dished plate so less power is lost.

The cranking of the hitch at 218 at the forward end of the beam 212 may not be essential but may help to ensure that the machine tracks centrally behind the tractor. Alternatively, the cranking may be such as to cause the machine to track to one side or the other of the centre line of the tractor if this is desired. Tracking to one side of the centre line may also be achieved by hitching the fork 216 to a hole located at one end or the other of the tool bar 222.

Because at least one of the wheel assemblies 224 can be steered, the tractor/machine combination is able to make exceptionally tight turns. In such tight turns the forward end of the beam 212 may foul the tool bar 222. To avoid this it may be desirable to hitch the forward end of the beam so that it rides on top of the tool bar.

In a less expensive variant of the machine, the cross beams 250 are omitted and single rotors may be mounted directly on the respective beams 212, 214.

In some cases it may be useful or even necessary to provide alternative means (such as electronic sensing means) for sensing a change in torque demand from the rotors and actuating the ram 58, the jacks 236 or other lifting means for lifting the rotors. This will, for example, be necessary when the rotors are not driven by hydraulic motors.

Because of factors already mentioned herein the rotor bodies and tynes have a long service life. Another f actor contributing to the long life of the tynes is that they are subject to few if any harmonic vibrations and are thus likely to fail due to fatigue- a common cause of tyne failure in conventional raking machines.

It will be clear to the reader that, to avoid repetition, illustrations of some components have been omitted from many Figures of the drawings.

What we claim is:

1. A rotor assembly for a hay making apparatus, including a rotor having a body of a resiliently deformable elastomeric material, arranged to be coupled to drive means for rotating the rotor about a rotational axis, and a plurality of tynes spaced about the periphery of the body, wherein each tyne comprises:

a first portion and a second portion, said first portion including at least one leg which projects through a passage in the body, said passage having transverse dimensions such that the leg is capable of sliding within the passage until the second portion of each tyne bears against the body, said second portion of each tyne being joined to the first portion and having a mass which is such that each tyne is held in an operational position solely by virtue of contact between the tyne and the body where the first portion passes through the passage and by virtue centrifugal force arising from rotation of the rotor which causes the second portion to be held against the body, each tyne being pivotable relative to the body such that the centrifugal force acts to orient the leg of each tyne at a predetermined angle with respect to a radial direction of the rotor.

2. A rotor assembly according to claim 1, wherein the first portion includes a pair of spaced apart legs which are joined to the second portion at respective ends thereof and project through the passage in the body.

3. A rotor assembly according to claim 1, wherein the body includes an upwardly extending wall portion in which there are located an upper row of passages and a lower row of passages, said first portion of each tyne including a first leg and a second leg which are joined to the second portion adjacent respective ends thereof, said first leg projecting through one of the passages in the upper row and said second leg projecting through one of the passages in the lower row.

4. A rotor assembly according to claim 3, wherein there is clearance between one of the passages in the upper row and the first leg so that, upon deflection of the tyne from the operational position, the first leg can move inwardly towards the rotational axis without substantial deflection of the body.

5. A rotor assembly according to claim 3, wherein the body comprises a flange-like skid portion which projects from the upwardly extending wall portion towards the rotational axis, said skid portion following undulations in a ground surface when the skid portions come into contact with the ground surface as the rotor rotates.

6. A rotor assembly according to claim 3, wherein the body comprises a flange-like portion for coupling the body to the drive means, said coupling portion projecting from the upwardly extending wall portion towards the rotational axis and springing upwardly under force applied by the body when said body comes into contact with a ground surface.

7. A rotor assembly according to claim 5, wherein the rotor includes a dished member being mounted on the body and projecting below the skid portion.

8. A rotor assembly according to claim 1, wherein the body is substantially annular.

9. Hay making apparatus including the rotor assembly according to claim 1, an hydraulic motor with an output shaft which is in axial alignment with the rotational axis of the rotor, means for coupling the rotor to the output shaft, and means for supporting the hydraulic motor and the rotor with the output shaft of the hydraulic motor in a substantially vertical disposition.

* * * * *